United States Patent
Zyrull et al.

(10) Patent No.: US 9,033,287 B2
(45) Date of Patent: May 19, 2015

(54) MOUNTING ARRANGEMENT FOR MOUNTING SYSTEMS AND AIRCRAFT OR SPACECRAFT

(75) Inventors: Doris Zyrull, Neu Wulmstorf (DE);
Marcus Juenemann, Hamburg (DE);
Hans Peter Guthke, Buxtehude (DE);
Barbara Lunitz, Hamburg (DE);
Lueder Kosiankowski, Harsefeld (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/205,174

(22) Filed: Aug. 8, 2011

(65) Prior Publication Data

US 2012/0037418 A1 Feb. 16, 2012

Related U.S. Application Data

(60) Provisional application No. 61/372,303, filed on Aug. 10, 2010.

(30) Foreign Application Priority Data

Aug. 10, 2010 (DE) .......................... 10 2010 039 133

(51) Int. Cl.
*H02G 3/32* (2006.01)
*H02G 3/30* (2006.01)

(52) U.S. Cl.
CPC ... *H02G 3/32* (2013.01); *H02G 3/24* (2013.01)

(58) Field of Classification Search
CPC .................................. H02G 3/32; H02G 3/24
USPC ........................... 439/557, 540.1, 558; 248/49
See application file for complete search history.

(56) References Cited

U.S. PATENT DOCUMENTS

| | | | |
|---|---|---|---|
| 919,558 | A | 4/1909 | Doran |
| 1,568,122 | A | 1/1926 | Zifferer |
| 2,877,974 | A | 3/1959 | Estes |
| 3,026,368 | A | 3/1962 | Lindsey |
| 3,053,494 | A | 9/1962 | Stoll |

(Continued)

FOREIGN PATENT DOCUMENTS

| | | |
|---|---|---|
| AT | 403 839 B | 8/2008 |
| DE | 902 482 B | 1/1954 |

(Continued)

OTHER PUBLICATIONS

German Office Action for German Application No. 10 2010 039 136.0 dated Oct. 15, 2010.

(Continued)

*Primary Examiner* — Amy Sterling
(74) *Attorney, Agent, or Firm* — Jenkins, Wilson, Taylor & Hunt, P.A.

(57) ABSTRACT

The present invention provides a mounting arrangement for mounting at least one electrical line on a structure, in particular of an aircraft or spacecraft, said mounting arrangement comprising: at least one module which comprises at least one terminal for connecting the electrical line; and a substantially U-shaped holder which comprises a central portion for mounting the electrical line for strain relief thereof and two side portions which are connected to the respective ends of the central portion and carry the central portion with spacing from the at least one module; the central portion of the holder having a changeable length.

17 Claims, 10 Drawing Sheets

(56) References Cited

U.S. PATENT DOCUMENTS

| | | | |
|---|---|---|---|
| 3,437,743 A | | 4/1969 | Hall |
| 3,836,102 A | | 9/1974 | Hall |
| 4,073,563 A | * | 2/1978 | Bailey et al. ............... 439/532 |
| 4,079,604 A | | 3/1978 | Anderegg |
| 4,171,861 A | * | 10/1979 | Hohorst ...................... 439/94 |
| 4,526,333 A | | 7/1985 | Nakama et al. |
| 4,541,155 A | | 9/1985 | Gagnon |
| 4,580,754 A | | 4/1986 | Hughes |
| 4,646,433 A | | 3/1987 | Le Houerou et al. |
| 5,112,015 A | | 5/1992 | Williams |
| 5,305,978 A | | 4/1994 | Current |
| 5,378,171 A | | 1/1995 | Czerlanis |
| RE35,677 E | | 12/1997 | O'Neill |
| 5,786,987 A | * | 7/1998 | Barbier et al. ............. 361/732 |
| 5,791,845 A | | 8/1998 | Fulop |
| 5,836,786 A | * | 11/1998 | Pepe ........................... 439/557 |
| 6,161,803 A | | 12/2000 | Daoud |
| 6,516,498 B2 | | 2/2003 | LaCoy et al. |
| 6,547,587 B2 | * | 4/2003 | Hurst et al. ............... 439/532 |
| 6,568,542 B1 | * | 5/2003 | Chen ........................... 211/26 |
| 6,666,340 B2 | * | 12/2003 | Basinger et al. ............. 211/26 |
| 6,994,300 B2 | | 2/2006 | Labeirie et al. |
| 7,238,105 B2 | | 7/2007 | Reinders |
| 7,534,958 B2 | * | 5/2009 | McNutt et al. .............. 174/68.1 |
| 7,772,325 B2 | | 8/2010 | Ashiura et al. |
| 8,040,693 B2 | * | 10/2011 | Blomquist .................. 361/826 |
| 8,141,826 B1 | | 3/2012 | Gallardo et al. |
| 8,534,614 B2 | | 9/2013 | Guthke et al. |
| 8,651,435 B2 | | 2/2014 | Guthke et al. |
| 2008/0296443 A1 | | 12/2008 | Lunitz et al. |
| 2009/0065658 A1 | | 3/2009 | Chen et al. |
| 2011/0006169 A1 | | 1/2011 | Abbott |
| 2012/0037756 A1 | | 2/2012 | Guthke et al. |
| 2012/0037763 A1 | | 2/2012 | Guthke et al. |
| 2012/0037765 A1 | | 2/2012 | Guthke et al. |

FOREIGN PATENT DOCUMENTS

| | | |
|---|---|---|
| DE | 86 20 533 U1 | 11/1986 |
| DE | 297 18 147 U1 | 2/1998 |
| DE | 20 2005 011 492 U1 | 12/2005 |
| DE | 10 2006 015 700 A1 | 11/2006 |
| DE | 10 2007 060 039 | 6/2008 |
| DE | 10 2007 060 030 A1 | 12/2008 |
| DE | 20 2008 011 723 | 12/2008 |
| EP | 0627587 A1 | 12/1994 |

OTHER PUBLICATIONS

German Office Action for German Application No. 10 2010 039 133.6 dated Mar. 22, 2011.

German Office Action for German Application No. 10 2010 039 134.4 dated Apr. 1, 2011.

German Office Action for German Application No. 10 2010 039 135.2 dated Apr. 1, 2011.

Non-Final Office Action for U.S. Appl. No. 13/205,963 dated Oct. 19, 2012.

Non-Final Office Action for U.S. Appl. No. 13/193,253 dated Feb. 15, 2013.

Final Office Action for U.S. Appl. No. 13/205,963 dated Feb. 21, 2013.

Notice of Allowance for U.S. Appl. No. 13/193,253 dated Oct. 8, 2013.

Final Office Action for U.S. Appl. No. 13/193,269 dated Oct. 10, 2013.

Advisory Action for U.S. Appl. No. 13/193,269 dated Jan. 22, 2014.

Non-Final Office Action for U.S. Appl. No. 13/193,269 dated Mar. 7, 2014.

Final Office Action for U.S. Appl. No. 13/193,269 dated Aug. 19, 2014.

Restriction Requirement for U.S. Appl. No. 13/193,269 dated Apr. 30, 2013.

Notice of Allowance for U.S. Appl. No. 13/205,963 dated May 15, 2013.

Final Office Action for U.S. Appl. No. 13/193,253 dated Jun. 17, 2013.

Non-Final Office Action for U.S. Appl. No. 13/193,269 dated Jun. 26, 2013.

Notice of Allowance for U.S. Appl. No. 13/193,269 dated Nov. 28, 2014.

Advisory Action for U.S. Appl. No. 13/193,269 dated Oct. 28, 2014.

* cited by examiner (F)

MOUNTING ARRANGEMENT FOR MOUNTING SYSTEMS AND AIRCRAFT OR SPACECRAFT

CROSS-REFERENCE TO RELATED APPLICATIONS

This application claims the benefit of and priority to U.S. Provisional Application No. 61/372,303, filed Aug. 10, 2010 and German patent application No. 10 2010 039 133.6, filed Aug. 10, 2010, the entire enclosures of which are herein incorporated by reference.

FIELD OF THE INVENTION

The present invention relates to a mounting arrangement for mounting systems and to an aircraft or spacecraft.

Although they can be applied to any systems and any aircraft or spacecraft, the present invention and the problem on which it is based will be described below in detail in relation to an electrical line in a passenger aircraft.

In a modern passenger aircraft, a large number of electrical components have to be interconnected by means of electrical lines. The electrical lines are usually guided through the passenger aircraft in the form of line bundles. Individual electrical lines which lead to the respective electrical components branch off from a respective line bundle at different points. This results in a tree-like structure for the electrical lines. The branched-off electrical lines are held at a respective branching-off point by means of a holder of a mounting arrangement and are electrically connected to one or more modules of the mounting arrangement. The modules are in turn connected to the electrical components by means of electrical lines.

BACKGROUND OF THE INVENTION

A known mounting arrangement 1 of this type is shown in a perspective view in FIG. 1A. FIG. 1B shows a holder 6 of the mounting arrangement 1 from FIG. 1A in a plan view. FIG. 1C shows the holder 6 from FIG. 1B in a side view.

The mounting arrangement 1 comprises a plurality of modules 2 to which a plurality of electrical lines 3 are connected. The modules 2 connect the electrical lines 3 to electrical components (not shown) of the passenger aircraft, which is denoted as a whole by reference numeral 4. The lines 3 branch off from a line bundle 5 which extends through the fuselage of the passenger aircraft 4.

The mounting arrangement 1 further comprises a substantially U-shaped holder 6. The lines 3 are fastened to a central portion 11 of the holder 6 by means of cable ties 7. The weight of the line bundle 5 can thereby be prevented from acting on the points where the lines 3 are connected to the modules 2, i.e. strain relief is provided for the lines 3. Damage to the connection points can thus be avoided.

The holder 6 further comprises two side portions 12, 13 which are connected to the respective ends 14, 15 of the central portion 11 and hold said central portion on holding plates 16, 17. For this purpose, the side portions 12, 13 are fastened to the holding plates 16, 17 by means of screws 18. The holding plates 16, 17 are fastened to a structure 21 of the passenger aircraft 4, for example to a crossbar.

The mounting arrangement 1 further comprises a rail 22 which is held between the mounting plates 16, 17 by means of screws 23. The plurality of modules 2 are releasably fastened to the rail 22. In FIG. 1A the modules 2 are mostly covered by the rail 22.

It is generally known to form the holder 6 in the form of a wire bracket coated with plastics material. However, this has proved disadvantageous against the background of the given problem.

The required length of the rail 22 varies depending on whether more or fewer of the modules 2 are required. However, this also has the result that the holding plates 16, 17 must be spaced apart from one another by different distances. In order to compensate these different distances between the holding plates 16, 17, it has been conventional in the past to provide holders 6 of different sizes and, according to the application, select a suitable holder 6 and attach it to the holding plates 16, 17. The production of holders 6 of this type of different sizes is associated with a comparatively high production cost. Furthermore, a storage cost for providing the holders 6 of different sizes is comparatively high.

With regard to the prior art, reference is further made to DE 10 2007 060 030 A1, which describes mounting devices, in particular for mounting line bundles.

SUMMARY OF THE INVENTION

The object of the present invention is therefore to provide a mounting arrangement and/or an aircraft or spacecraft which at least reduce(s) the above-described drawbacks.

This object is achieved by a mounting arrangement having the features of claim 1 and/or by an aircraft or spacecraft having the features of claim 15.

Accordingly, a mounting arrangement for mounting at least one electrical line on a structure, in particular of an aircraft or spacecraft, is provided, said mounting arrangement comprising: at least one module which comprises at least one terminal for connecting the electrical line; and a substantially U-shaped holder which comprises a central portion for mounting the electrical line for stress relief thereof and two side portions which are connected to the respective ends of the central portion and carry the central portion with spacing from the at least one module; the central portion of the holder having a changeable length.

An aircraft or spacecraft is also provided, comprising: a structure; at least one electrical line; and the mounting arrangement according to the invention, which is fastened to the structure and holds the electrical line relative to the structure.

The idea underlying the present invention consists in providing the central portion of the holder with a changeable length. If a size of the holder is then to be changed, this can be achieved in a simple manner by shortening or lengthening the central portion or replacing the central portion with a longer or shorter central portion. As a result, the high cost in terms of the production of complete holders of different sizes is avoided. Furthermore, storage for provision of the holders is also simplified, since complete holders of different sizes no longer need to be provided.

Advantageous configurations and developments of the mounting arrangement according to the invention emerge from the dependent claims.

According to a development, the at least one module and first ends of the side portions of the holder can be fastened to a rail of the mounting arrangement in different positions in the longitudinal direction of the rail, which can be fastened to the structure. Thus, the side portions of the holder can be fastened in different positions in order to accommodate the shortened or lengthened central portion of the holder.

According to a preferred development, the at least one module and the first ends of the side portions of the holder are displaceably engaged with the rail in the longitudinal direction thereof. As a result, the side portions of the holder can be displaced along the rail in a simple manner in order to accommodate the shortened or lengthened central portion of the holder. Moreover, more or fewer modules can be threaded onto the rail or removed therefrom. The at least one module and the first ends of the side portions advantageously have identically formed engagement geometries which are engaged with the rail with a positive fit.

According to a further preferred development, the at least one module is arranged between the first ends of the side portions of the holder, at least one stopper element, which prevents a displacement of the at least one module and the first ends of the side portions in the longitudinal direction of the rail, being releasably fastened to the rail.

According to a further preferred development, the central portion of the holder is rod-shaped and is inserted through holes in second ends of the side portions of the holder. A central portion of this type can easily be provided as bulk stock, a correspondingly long central portion then being cut to length from the bulk stock according to the desired size of the holder, inserted through the holes in the second ends of the side portions and fastened.

According to a preferred development, the holes and the central portion together form an interference fit. For example, the interference fit can be achieved in that the second ends of the side portions including the holes formed therein are heated and the central portion of the holder is cooled and the central portion is then inserted into the holes. However, it is equally conceivable to connect the central portion to the side portions by means of any connection technologies, for example by means of gluing or by means of a positive fit.

According to a further preferred development, at least one of the holes has a tapered longitudinal section. As a result, the interference fit can be improved still further.

According to a further preferred development, the central portion has a circular cross-section and the at least one hole has a square or polygonal shape. In particular, a hexagonal shape is also considered. The square or polygonal shape results in edges which are engaged with the central portion, and the interference fit is improved still further as a result.

According to a further preferred development, the central portion has a circular cross-section and the at least one hole is star-shaped. By means of this measure, too, edges are formed which are engaged with the central portion, and the interference fit is improved still further as a result.

According to a further preferred development, edges of the star shape are rounded. As a result, the engagement between the star shape and the central portion is improved still further.

According to a further preferred development, the holder is made up of a plurality of interconnected modular elements. "Modular" means that the elements have uniform interfaces which make it possible to connect an element to a respective other element. The connection is preferably a plug-in system. If the central portion of the holder is provided as an element of this type and in different lengths, a holder can easily be produced in different sizes.

According to a further preferred development, first ends of the side portions of the holder carry a rail, to which the at least one module is fastened, and the first ends of the side portions preferably further comprise fastening means for fastening the holder to the structure. As a result, additional holding means, for example the holding plates described at the outset, for holding the rail on the structure can be omitted.

According to a further preferred development, the first ends of the side portions insulate the rail electrically from the structure. Thus, the cost of insulation, otherwise necessary per se, of the rail from the structure is not applicable.

According to a further preferred development, at least one second end of the side portions is connected to the central portion by means of a cable tie. As a result, the central portion can be connected to the side portion safely and simply.

The central portion is preferably formed of a plastics material, in particular polyetherketone (PEEK) or polyaryletherketone (PEAK).

BRIEF DESCRIPTION OF THE DRAWINGS

The invention will now be described in greater detail by way of embodiments with reference to the accompanying figures of the drawings, in which.

In the figures, like reference numerals denote like or functionally similar components unless information to the contrary is given.

DETAILED DESCRIPTION OF THE INVENTION

Figure 1A:
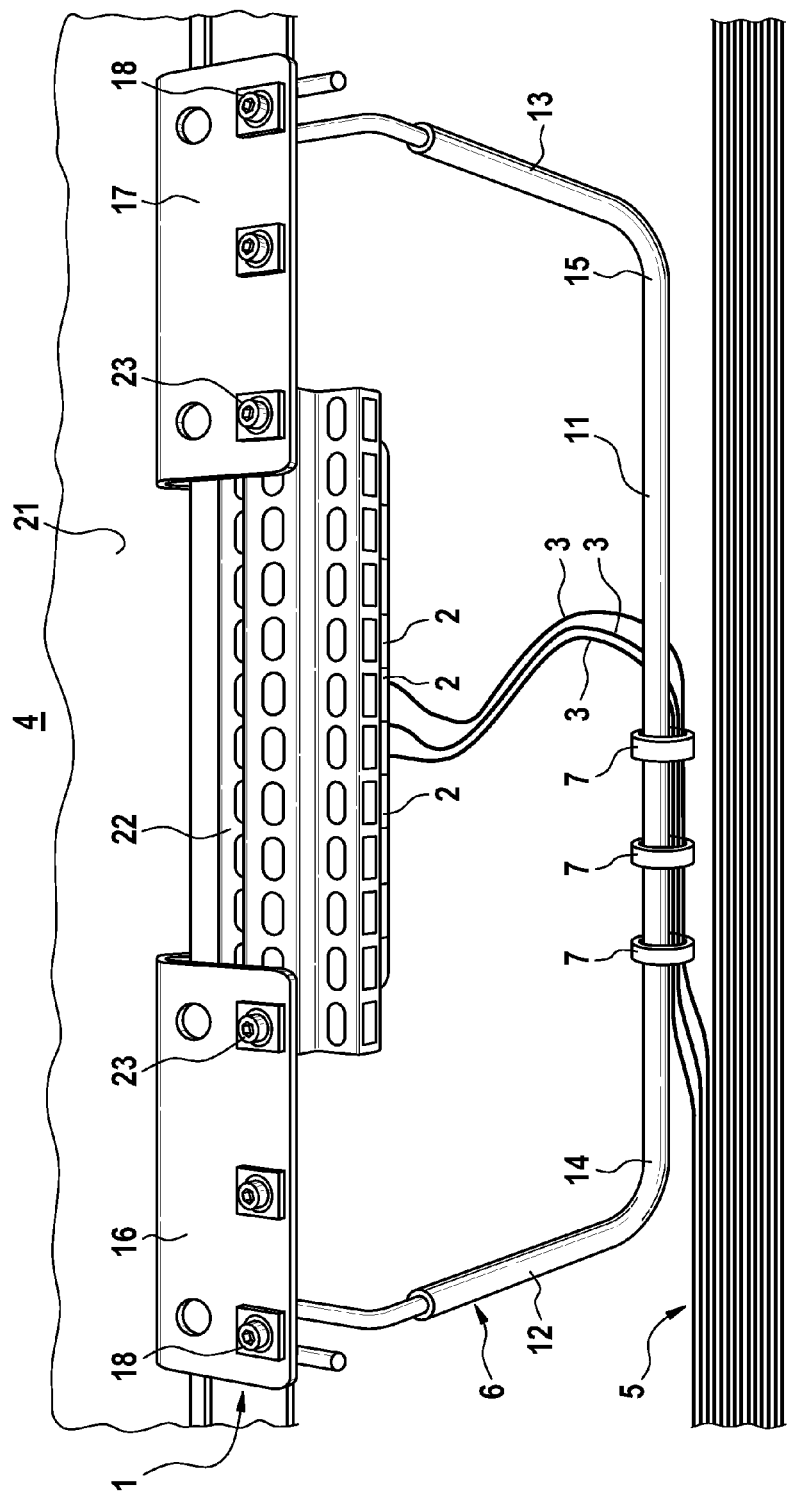
FIG. 1A is a perspective view of a known mounting arrangement.
Figure 1C:
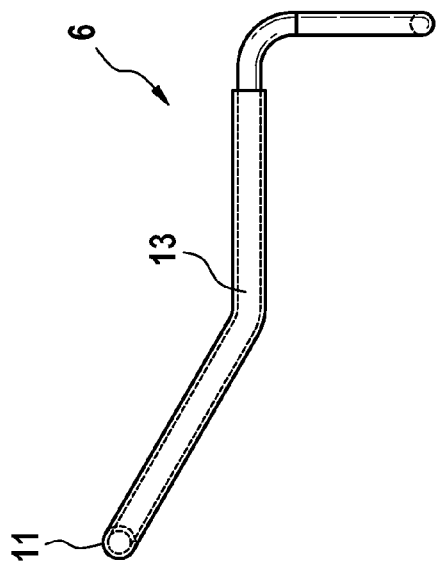
FIG. 1C is a side view of the holder from FIG. 1B.
Figure 1B:
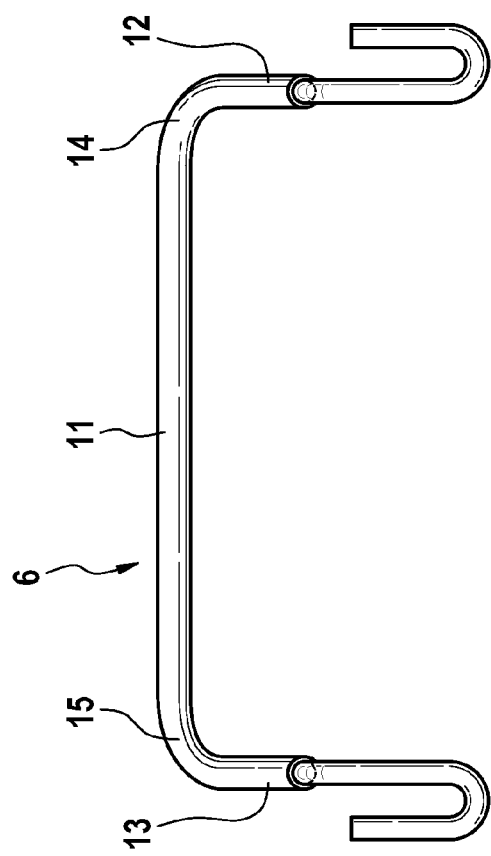
FIG. 1B is a plan view of a holder from FIG. 1A.
Figure 2A:
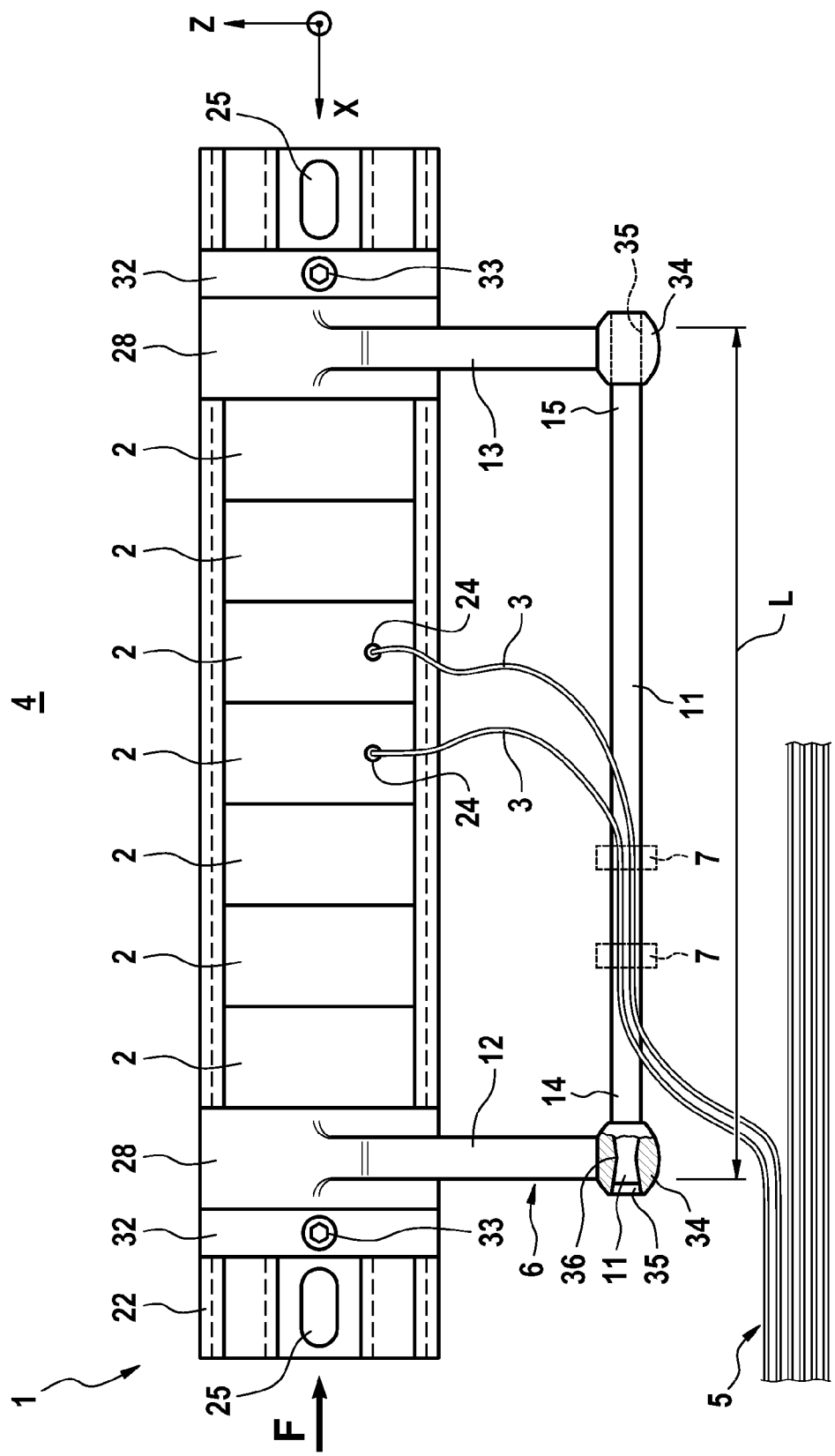
FIG. 2A is a plan view of a mounting arrangement according to an embodiment of the present invention.
Figure 2B:
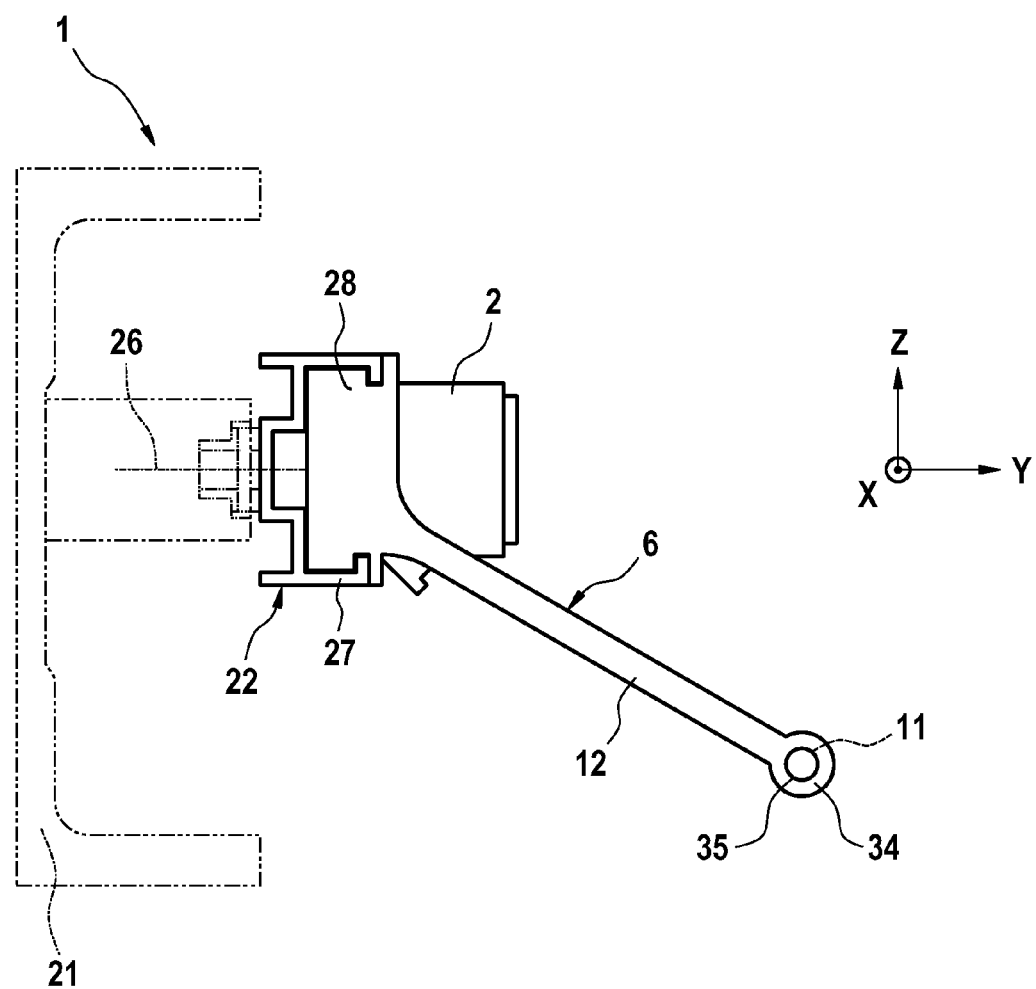
FIG. 2B is a view F from FIG. 2A.
Figure 2C:
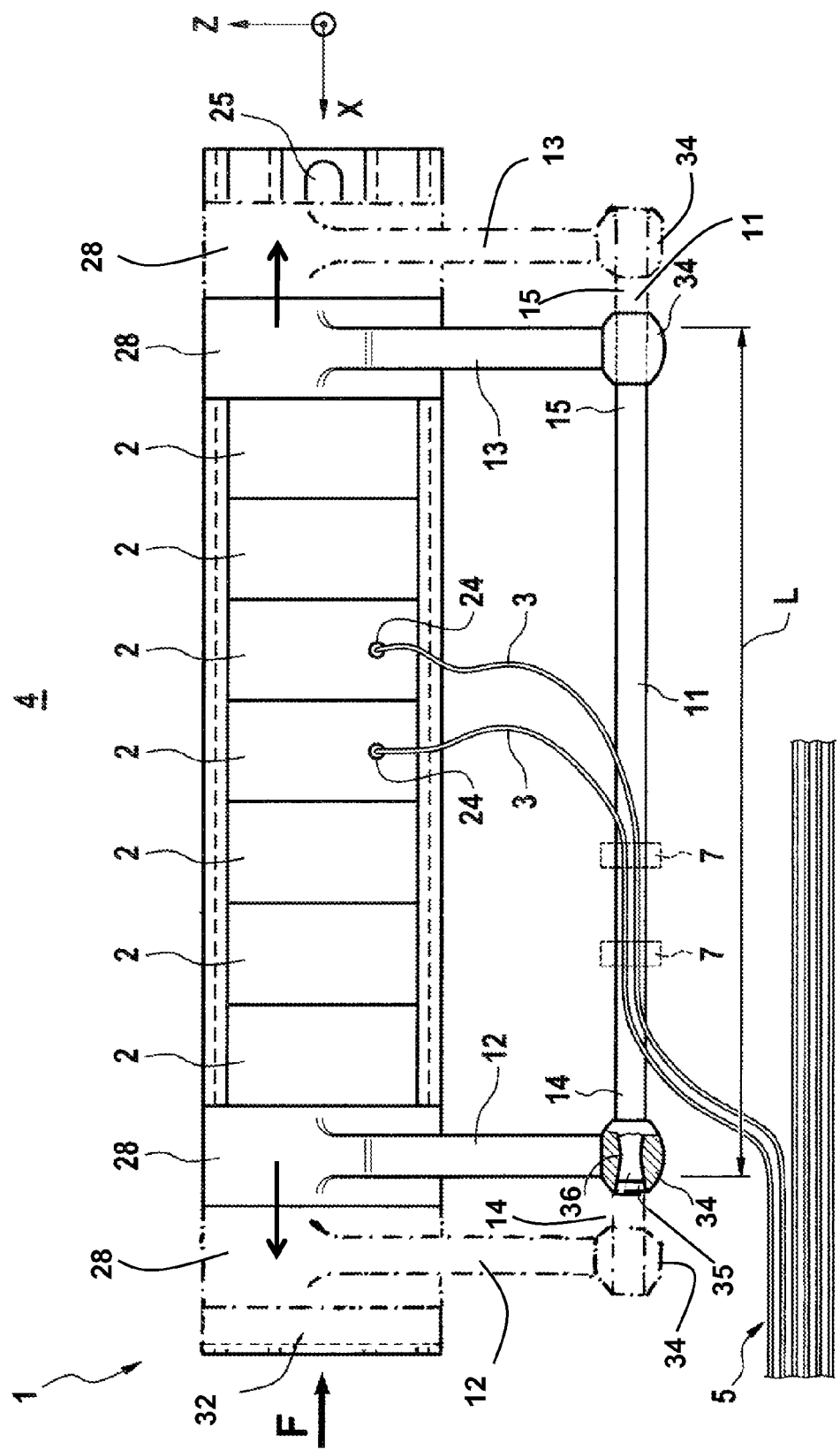
FIG. 2C is a further plan view of the mounting arrangement according to FIG. 2A.

FIG. 2A is a plan view of a mounting arrangement 1 according to an embodiment of the present invention, and FIG. 2B is a view F from FIG. 2A. Further, FIG. 2C is a further plan view of the mounting arrangement according to FIG. 2A.

The mounting arrangement 1 holds a plurality of electrical lines 3 on a structure 21 (see FIG. 2B) of a passenger aircraft which in general is denoted by reference numeral 4. The electrical lines 3 can for example branch off from a line bundle 5 which extends through the passenger aircraft 4.

The mounting arrangement 1 comprises a plurality of modules 2. Each of the modules 2 comprises one or more terminals 24 to which the lines 3 are connected. The modules 2 are in turn connected to electrical components of the passenger aircraft 4 in a manner which is not shown.

The mounting arrangement 1 further comprises a substantially U-shaped holder 6. The holder 6 comprises a central portion 11 which holds the lines 3 for strain relief thereof. The lines 3 can for example be fastened to the central portion 11 by means of cable ties 7 indicated by way of dashed lines. The holder 6 further comprises two side portions 12, 13. The side portions 12, 13 are connected to opposite ends 14, 15 of the central portion 11 and carry said central portion with spacing from the modules 2. The length L of the central portion 11 of the holder 6 can be changed, as described in further detail below.

The mounting arrangement 1 further comprises a rail 22 which for example is fastened to the structure 21 by means of slots 25. The slots 25 can for example be screwed to the structure 21 by means of screws (see FIG. 2B).

The rail 22 is formed with a receiving portion 27 (see FIG. 2B) which has a constant cross-section in the longitudinal direction X of the rail 22 and is engaged with an engagement portion 28 of the side portion 12 of the holder 6 with a positive fit. The engagement portion 28 forms a first end of the side portion 12.

The engagement is such that the side portion 12 is displaceable in relation to the rail 22 in the longitudinal direction X thereof (see in particular FIG. 2C). The engagement further prevents a movement of the side portion 12 in relation to the rail 22 in the transverse direction Y thereof. A movement in a third spatial direction Z perpendicular to the longitudinal and transverse directions X, Y is also prevented. The Z direction can for example coincide with the vertical direction of the aircraft 4.

The above configurations regarding the side portion 12 apply equally to the side portion 13.

The modules 2 each comprise an engagement portion (not shown) which is identical to the engagement portion 28 of the side portion 12 of the holder 6, in such a way that the modules 2 are also engaged with the rail 22 in the above-described manner. It is thus possible for example to "thread" an additional module 2 onto the rail 22 or to "unthread" a module 2 from the rail 22, i.e. to insert a module into the rail or remove it therefrom. If for example a module 2 is removed from the rail 22, the side portions 12, 13 of the holder 6 move closer together in the longitudinal direction X. Similarly, an additional module 2 can be arranged between the side portions 12, 13 of the holder 6, said side portions then being spaced further apart from one another in the longitudinal direction X. It is only possible to insert or remove a module 2 when at least one of the side portions 12, 13 has been removed from the rail 22 beforehand.

As a result, the side portions 12, 13 of the holder 6 and also the module 2 can be positioned in different positions along the longitudinal direction X of the rail 22 (see FIG. 2C). A respective position can be established by fixing stopper elements 32 (see FIG. 2A) to the rail 22 on each side of the side portions 12, 13 of the holder 6. For example, the stopper elements 32 are fixed to the rail 22 by means of set screws 33. The engagement portions 28 of the side portions 12, 13 abut the stopper elements 32 in the longitudinal direction X (see FIGS. 2A and 2C). For reasons of clarity, the stopper element 32 is not shown in FIG. 2B.

The side portions 12, 13 each comprise, opposite the first ends thereof, second ends which are formed with a head 34. Each of the heads 34 comprises a hole 35 through which the central portion 11 extends. The central portion 11 is preferably formed as a plastics material rod, for example made of PEET or PEAK.

The central portion 11 can be connected to the heads 34 in a variety of ways. For example, the central portion 11 can be glued in place in the holes 35 in the heads 34. Alternatively, the central portion 11 can be held in the holes 35 in the heads 34 by means of an interference fit, as explained in greater detail below in connection with FIG. 3A-3C. In particular in the case of an interference fit being provided, the hole 35 can be formed with a longitudinal section 36 which tapers in the longitudinal direction X, as shown schematically in FIG. 2A for the left-hand hole 35.

If the length L of the central portion 11 is to be changed, a central portion 11 of a suitable length is cut to length from a bulk stock, guided through the holes 35 and fixed. As a result, the length L of the central portion 11 of the holder 6, and thus also the spacing between the side portions 12, 13, can easily be changed. This makes it possible to react in a flexible manner when more or fewer modules 2 are required.

Figure 3A:
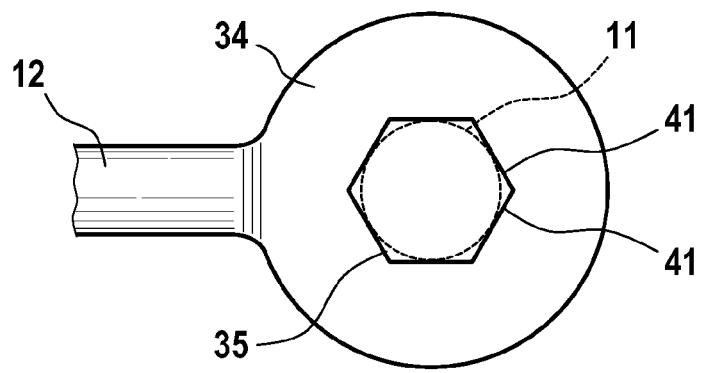
FIGS. 3A-3C show various configurations of a hole in a second end of a side portion of the holder from FIG. 2A.
Figure 3B:
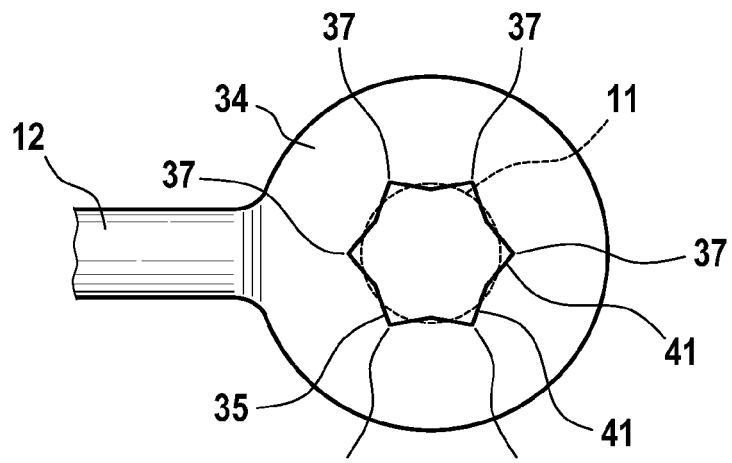
Figure 3C:
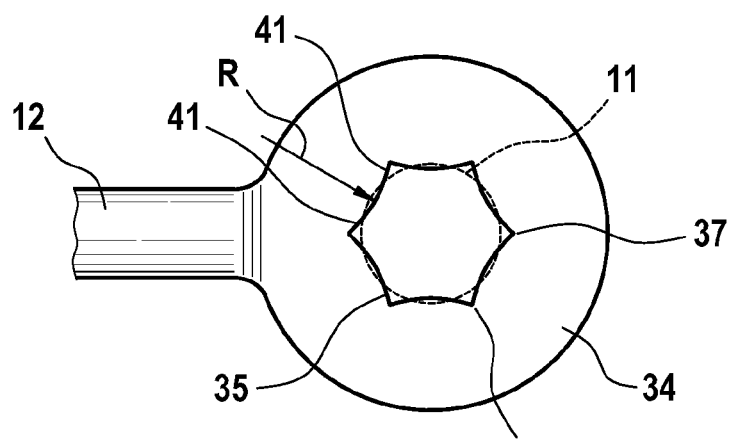

Various embodiments of the head 34 from FIG. 2A will be explained in greater detail below in connection with FIG. 3A-3C. In FIG. 3A-3C the cross-section of the central portion 11 is indicated by way of dashed lines.

The central portion 11 preferably has a circular cross-section. The hole 35 can for example have a hexagonal shape with edges 41, as shown in FIG. 3A. The edges 41 press into the central portion 11 and improve the interference fit.

Furthermore, the hole 35 can have a star shape with for example six points 37 (see FIG. 3B). The edges 41 limiting the points 37 press into the central portion 11 and improve the interference fit. It is further conceivable to round the edges 41 with a radius R, as shown in FIG. 3C.

Figure 4:
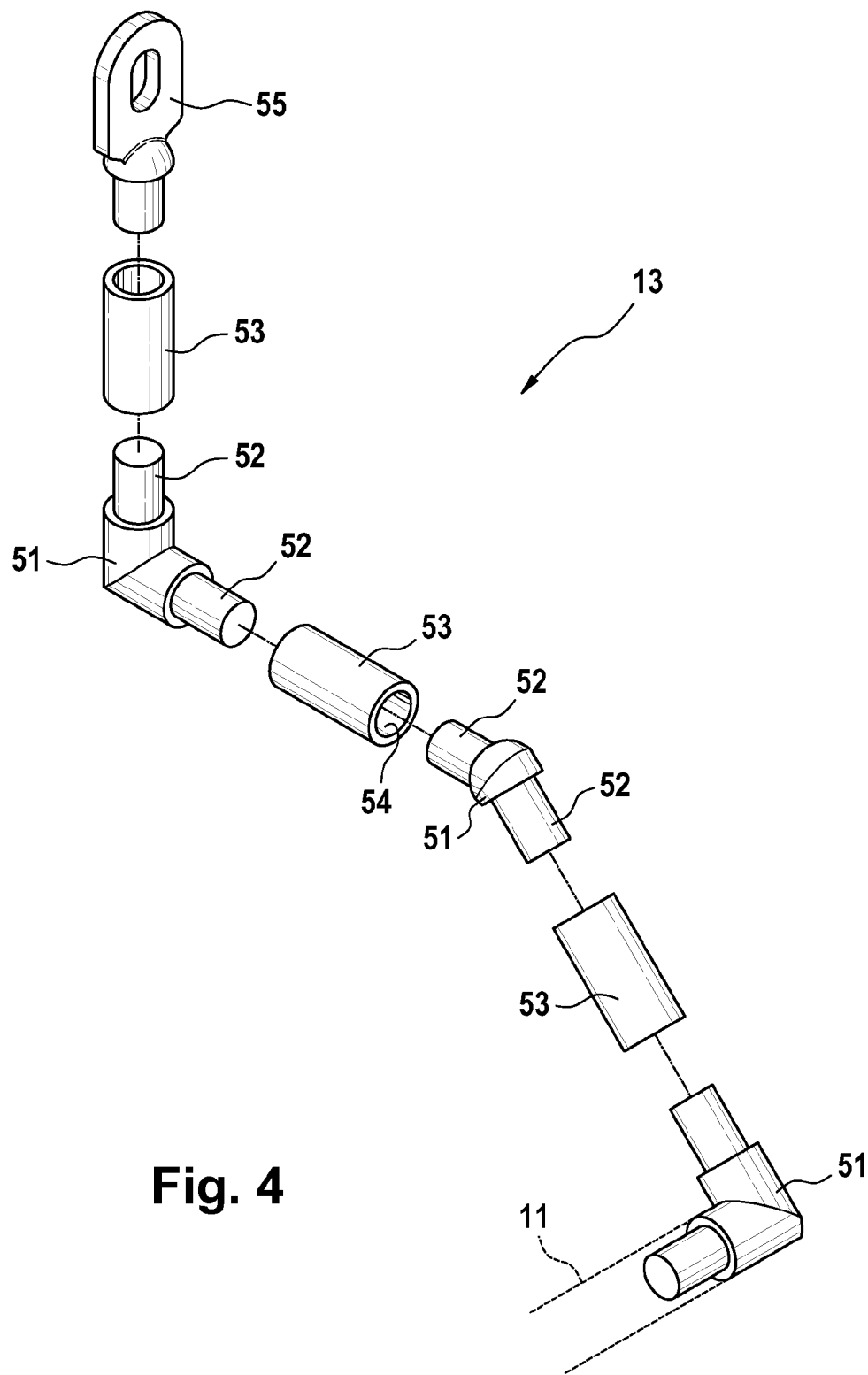
FIG. 4 is a perspective view of a side portion of a holder of a mounting arrangement according to a further embodiment of the present invention.

FIG. 4 is a perspective view of a side portion 13 of a holder 6 (not shown further) of a mounting arrangement 1, for example the mounting arrangement 1 from FIG. 2A, according to a further embodiment of the present invention.

The side portion 13, similarly to the entire holder 6 (not shown further), is made up of a plurality of modular elements. For example, the side portion 13 comprises corner parts 51 comprising engagement portions 52, and intermediate pieces 53 comprising receiving portions 54. The corner parts 51 and the intermediate pieces 53 can be provided in different dimensions and configurations, the engagement portions and receiving portions 52, 54 always being formed in the same manner, in such a way that holders of virtually any size can be formed by means of the corner parts 51 and the intermediate pieces 53 and any end pieces 55. The engagement portions and receiving portions 52, 54 can be interconnected according to the plug-in principle.

The length L of the central portion 11 indicated by way of dashed lines in FIG. 4 can be adapted in that said central portion is provided as a tube which corresponds to the intermediate pieces 53 and is cut to a suitable length L from a bulk stock as required.

Figure 5:
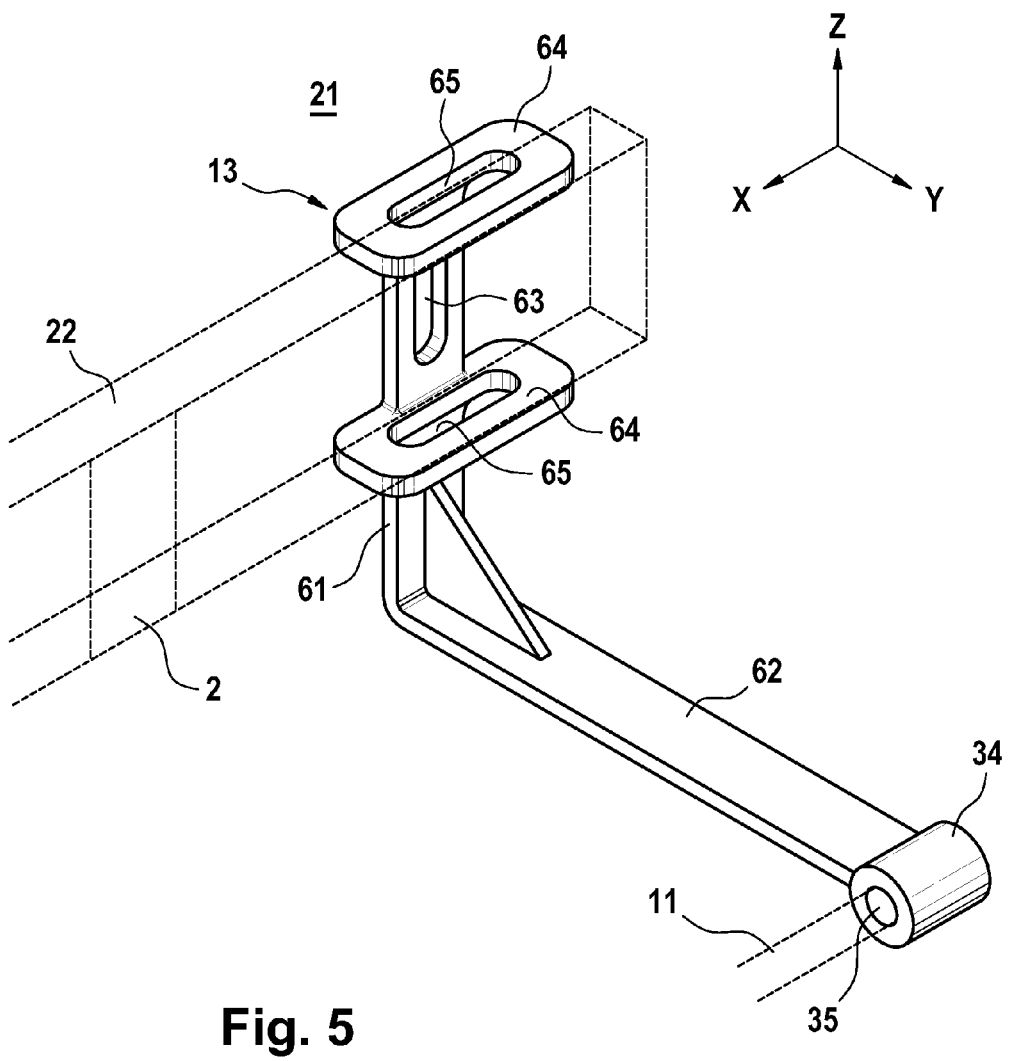
FIG. 5 is a perspective view of a side portion of a holder of a mounting arrangement according to yet another embodiment of the present invention.

FIG. 5 is a perspective view of a side portion 13 of a holder 6 (not shown further) of a holding arrangement according to a further embodiment of the present invention.

The side portion 13, which is formed as an angle bracket, can be made up of a first portion 61 and a second portion 62 which are preferably arranged approximately perpendicular to one another. The first portion 61 is for example fastened to the structure 21 (not shown further) by means of a slot 63 and a screw (not shown). The first portion 61 receives the rail 22, as described in FIG. 2A, including the modules 2 thereof, displaceably between two opposing portions 64. The portions 64 can comprise slots 65 including screws (not shown) in order to fix the rail 22 in a particular position along the longitudinal direction X thereof to the first portion 61.

At least the first portion 61 is formed from an insulating material, for example plastics material, and holds the rail 22 including the modules 2 with spacing from and electrically insulated from the structure 21.

In addition, the holding arrangement, into which the side portion 13 shown in FIG. 5 is integrated, can be formed according to the mounting arrangement 1 from FIG. 2A.

Figure 6A:
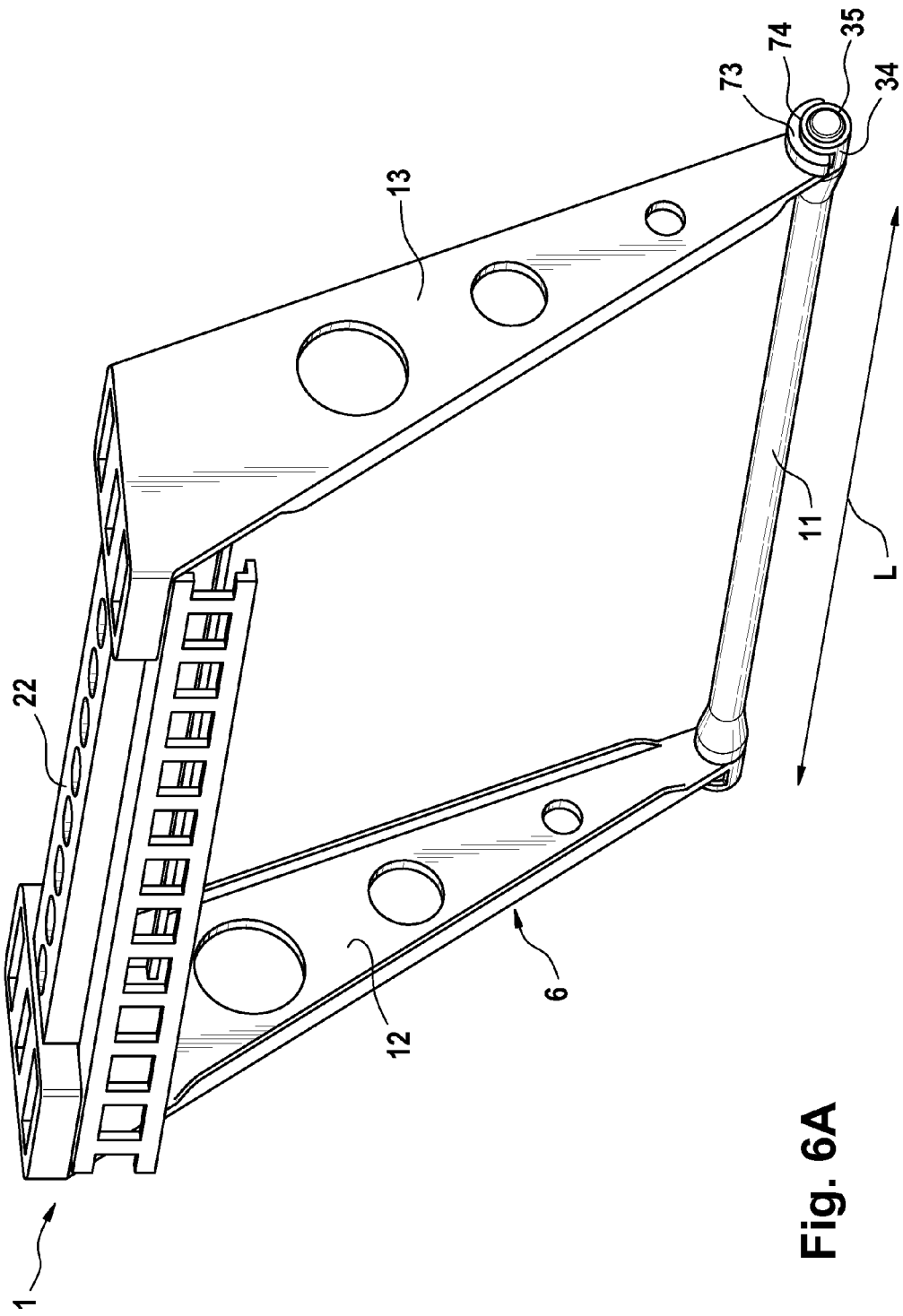
FIG. 6A is a perspective view of a mounting arrangement according to yet another embodiment of the present invention.
Figure 6B:
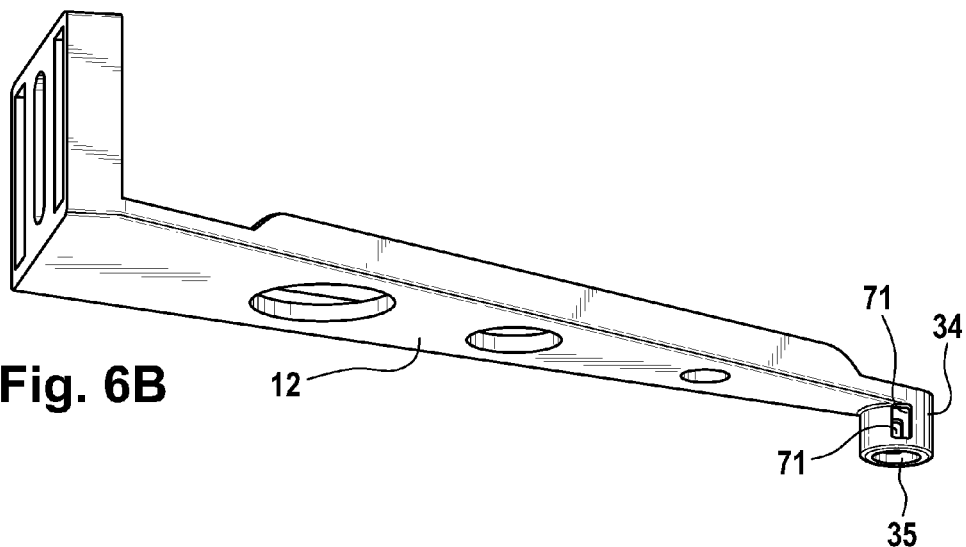
FIG. 6B-6D are perspective views of various components of the mounting arrangement from FIG. 6A.
Figure 6C:
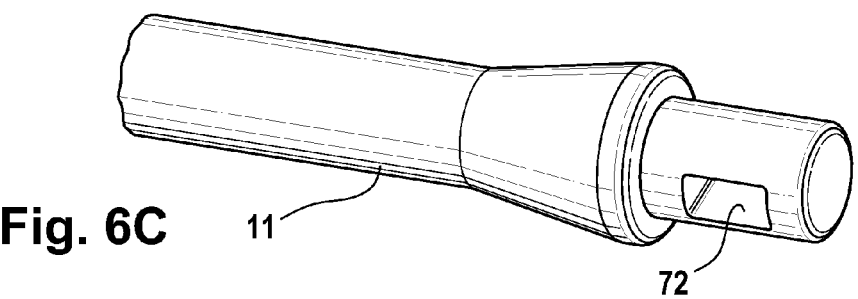
Figure 6D:
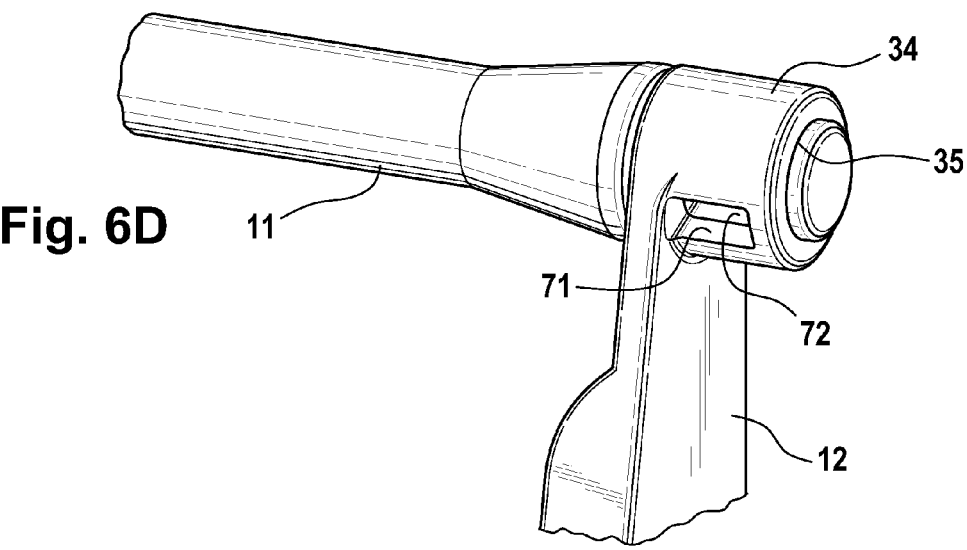

FIG. 6A is a perspective view of a mounting arrangement 1 according to yet another embodiment of the present invention. FIG. 6B-6D are each perspective views of various components of the mounting arrangement 1 from FIG. 6A.

The length L of the central portion 11 of the holder 6 of the mounting arrangement 1 from FIG. 6A can be changed by providing central portions 11 of different lengths, which are then inserted into the holes 35 in the heads 34 of the side portions 12, 13 as required and fastened therein. Accordingly, a rail 22 of the same length L is then also to be selected from a provided supply of rails 22 of different lengths and used to form the mounting arrangement 1 from FIG. 6A.

FIG. 6B shows that the side portion 12 can be formed with a head 34 which comprises radial recesses 71 which oppose one another diagonally at the periphery of the substantially cylindrical head 34. The recesses 71 are overlapped with recesses 72 (see FIG. 6C) in the central portion 11 (see FIG. 6D). A cable tie 73 (see FIG. 6A) is then threaded through the recesses 71, 72 (see FIG. 6D), substantially diagonally through the central portion 11. The cable tie 73 is then tightened in the conventional manner, it then clasping a peripheral portion 74 of the head 34 (see FIG. 6A). The central portion 11 is thus connected to the head 34 of each side portion 12, 13 with a positive fit.

Although the present invention has been described on the basis of preferred embodiments, it is not restricted thereto, but can be modified in many different ways. The developments and embodiments described in the present case for the mounting arrangement according to the invention can also be applied accordingly to the aircraft or spacecraft according to the invention. It should also be noted that where "a/an" is used herein this does not exclude a plurality.

Reference is also expressly made to the fact that the various embodiments can be combined with one another. Thus, for example, the fastening by means of cable ties 73 could also be used in the case of the mounting arrangement according to FIGS. 2A, 2B and 2C, 3A-3B, 4 or 5.

What is claimed is:

1. A mounting device for mounting at least one electrical line on a structure of an aircraft or spacecraft, said mounting arrangement comprising:
   a rail, wherein the rail is formed with receiving portions having a constant cross-section in a longitudinal direction of the rail;
   at least one module which comprises at least one terminal for connecting the electrical line; and
   a substantially U-shaped holder which comprises a central portion for mounting the electrical line for strain relief thereof and two side portions which are connected to the respective ends of the central portion and carry the central portion with spacing from the at least one module, wherein the two side portions are adapted to be connected to central portions of different lengths;
   wherein each side portion of the substantially U-shaped holder comprises an engagement portion configured to engage one of the receiving portions so that the engagement portion is displaceable in relation to the rail in the longitudinal direction thereof, wherein movement of the side portions in relation to the rail in a transverse direction thereof and in a third spatial direction perpendicular to the longitudinal and transverse directions is prevented;
   wherein the length between the side portions is changeable according to the length of the central portion to be connected to the side portions, due to a sliding of the engagement portions toward or away from each other along the longitudinal direction of the rail for accommodating more or fewer than the at least one module, and thereby facilitating electrical connection to any number of electrical components of the aircraft; and
   wherein each receiving portion of the rail is configured to engage one of the engagement portions of the side portions of the holder with a positive fit.

2. The mounting arrangement according to claim 1, wherein the at least one module and first ends of the side portions of the holder can be fastened to the rail of the mounting arrangement in different positions in the longitudinal direction of the rail, which can be fastened to the structure.

3. The mounting arrangement according to claim 1, wherein the at least one module is arranged between the first ends of the side portions of the holder at least one stopper element, which prevents a displacement of the at least one module and the first ends of the side portions in the longitudinal direction of the rail, being releasably fastened to the rail.

4. The mounting arrangement according to claim 1, wherein the central portion of the holder is rod-shaped and is inserted through holes in second ends of the side portions of the holder.

5. The mounting arrangement according to claim 4, wherein the holes and the central portion together form an interference fit.

6. The mounting arrangement according to claim 4, wherein at least one of the holes has a tapering longitudinal section.

7. The mounting arrangement according to claim 4, wherein the central portion has a circular cross-section and the at least one hole has a square or polygonal shape.

8. The mounting arrangement according to claim 4, wherein the central portion has a circular cross-section and the at least one hole is star-shaped.

9. The mounting arrangement according to claim 8, wherein edges of the star shape are rounded.

10. Mounting arrangement according to claim 1, wherein first ends of the side portions of the holder carry a rail, to which the at least one module is fastened, and comprise fastening means for fastening the holder to the structure.

11. Mounting arrangement according to claim 10, wherein the first ends of the side portions insulate the rail electrically from the structure.

12. Mounting arrangement according to claim 1, wherein at least a second end of the side portions is connected to the central portion by means of a cable tie.

13. Aircraft or spacecraft, comprising:
    a structure;
    at least one electrical line; and
    a mounting arrangement according to claim 1 which is fastened to a structure and holds the electrical line relative to the structure.

14. The mounting arrangement according to claim 1, wherein the two side portions are each formed as a single part.

15. The mounting arrangement according to claim 1, wherein the central portion is formed as a single part.

16. The mounting arrangement according to claim 14, wherein the two side portions comprise an insulating material.

17. The mounting arrangement according to claim 14, wherein at least one of the two side portions or the central portion comprises a plastic material.

* * * * *